United States Patent [19]
Newton

[11] 3,820,268
[45] June 28, 1974

[54] BITE SIGNAL FOR FISHING ROD
[76] Inventor: Elbert J. Newton, 8912 Candelaria, Albuquerque, N. Mex. 87112
[22] Filed: Mar. 29, 1973
[21] Appl. No.: 345,830

[52] U.S. Cl. ............................................. 43/17
[51] Int. Cl. ...................................... A01k 97/12
[58] Field of Search ....................................... 43/17

[56] References Cited
UNITED STATES PATENTS
2,302,337  11/1942  Mantell .................................. 43/17
3,696,546  10/1972  Ambrose ................................ 43/17

Primary Examiner—Robert Peshock
Assistant Examiner—Daniel J. Leach
Attorney, Agent, or Firm—Clarence A. O'Brien; Harvey B. Jacobson

[57] ABSTRACT

An electric circuit make and break device for use on a bendably resilient pull responsive outer end portion of a fishing rod, said device comprising inward and outward properly oriented current conducting clips. These clips are elongated and substantially U-shaped in plan and have forward and rearward companion adapters adhesively anchored atop selected portions of the rod and have their adjacent lateral end portions coordinated and providing normally open but closable contact elements. One contact element is equipped with a manually regulatable setscrew capable of controlling the sensitivity of the circuit closing step. Visual and audible bite signals, one a light and the other one a buzzer, are electrically wired to the complemental clips for simultaneous operation in a manner to alert the angler so that he can play and land his catch in keeping with the conditions at hand.

7 Claims, 6 Drawing Figures

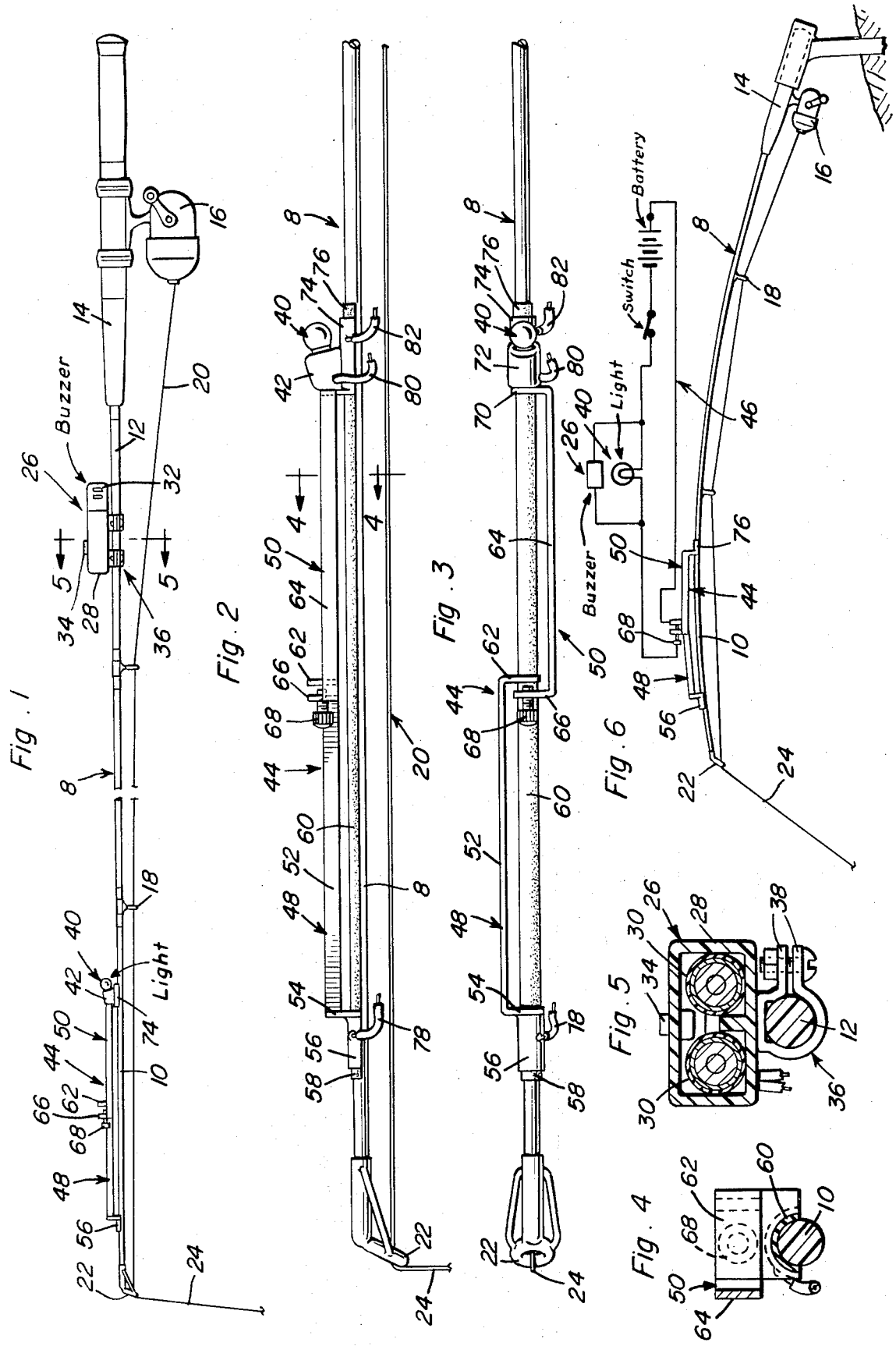

3,820,268

BITE SIGNAL FOR FISHING ROD

This invention relates to bite signalling devices such as are utilized on and in association with a currently used fishing rod equipped with suitable visual and audible signals which are supported on the rod for simultaneous operation and has to do, more particularly, with novel circuit make and break means which is mounted and readied for operation on a bendably resilient portion of the rod and is automatically activated when a fish takes the line attached hook, bends the rod and closes the signalling circuit.

Many and structurally different bite signalling devices have been devised and offered for use by those who have sought to advance the field of angling and alerting signals such as are expressly designed and adapted for use on fishing rods. For background information attention is invited to an intermittent type flashing signal disclosed in U.S. Pat. No. 2,714,270 granted to Howard J. Premo. Premo is cited for general interest only. An audible type fish bite detecting adaptation for use on various types of fishing rods is shown in U.S. Pat. No. 3,283,438 granted to Burton E. Wagner. As having a more direct bearing on the disclosed invention and because it shows a bendable pull responsive fishing pole or rod, attention is directed to the signal attachment revealed in U.S. Pat. No. 2,302,337 issued to Samuel A. Mantell.

An object of the present invention, generally stated, is to improve upon prior art rod-mounted bite signalling attachments and, in so doing, to simplify the construction and assured performance thereof, to reduce the cost of manufacture, to minimize the likelihood of malfunctioning, to provide a construction which can be carried through brush, weeds and bushes with a minimal chance of snagging on obstructions, which is strong and durable, and well serves the purposes for which it has been devised for feasible use.

Also, and as will be evident from the outset the herein disclosed concept pertains not only to one signalling device but to a visual light and an audible buzzer so constructed and coordinated that they are simultaneously operable to better fulfill the requirements of the angler while passing the time reading or otherwise loafing but desirous of being alerted when called upon to act.

Briefly the instant invention, construed from the combination aspect thereof, is characterized by a fishing rod of a conventional type having an inward end provided with a handgrip and a pressure responsive bendably resilient outward end portion, distributively positioned line guides and a fishing line slidingly threaded through the respectively cooperable eyes. Inward and outward current conducting clips having forward and rearward end portions are supported by appropriate saddling adapters atop oriented surfaces of the bendably resilient portion of the rod and have their adjacent and coacting end portions provided with confronting and coordinating terminal ends which in turn, provide normally open but closable circuit make-and-break contact elements. One contact element for sensitivity of control is preferably provided with a manually regulatable setscrew. Bite signalling means is electrically wired to the clips and provides the desired visual and audible signals and are simultaneously operable for best overall alerting results.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a view in side elevation of a conventional fishing rod readied for use and provided with the aforementioned circuit make and break means on the bendable portion and also with a signalling bulb or light and a complemental audible signalling buzzer, the latter being mounted on the rod adjacent the handle.

FIG. 2 is an enlarged view detailing the clips which go to make up the aforementioned novel circuit make-and-break means.

FIG. 3 is a top plan view of the circuit make-and-break means showing the details with greater particularity.

FIG. 4 is an enlarged detail section taken approximately on the plane of the vertical section line 4—4 of FIG. 2 looking in the direction of the indicating arrows.

FIG. 5 is an enlarged view in section and elevation taken approximately on the plane of the vertical section line 5—5 of FIG. 1.

FIG. 6 is a diagrammatic view showing the wiring diagram, the bendable feature of the rod and how the circuit make-and-break means functions when the rod is bent by a pull on the fishing line.

With reference first to FIG. 1 it is evident that the fishing rod is of a conventional type and may vary in construction. The rod proper is denoted by the numeral 8, the outward or leading bendable end portion is denoted at 10, the inner comparably rigid portion is denoted at 12, the handle or handgrip at 14 and the reel at 16. The fishing line is threaded through the usual guide eyes 18 and is denoted, generally stated, by the numeral 20. The outermost line guide eye is denoted at 22 and the depending portion of the fishing line at 24.

The audible bite detecting and signalling means, also referred to as a buzzer, is denoted, generally stated, by the numeral 26 and may vary in construction. It is mounted on the portion 12 of the rod and is characterized, as shown in FIG. 5, by a suitably constructed casing or housing 28 for dry cell batteries 30. The buzzer is denoted at 32 and the off-and-on press button is denoted at 34. The botton-attached clamps are denoted at 36, surround the rod 12, and have side-fastened grips 38.

The visual bite light or signal is denoted by the numeral 40, is renewably mounted in a socket member 42 provided therefor and constitutes a component part of the novel attachment-type circuit make-and-break means 44. The two signalling devices 26 and 40 are wired together for simultaneous operation as illustrated by way of the wiring diagram 46 in FIG. 6. This wiring diagram, generally touched upon, embodies the battery, adjacent switch, and conjointly wired bite signals 26 and 40, respectively.

With reference now to the circuit make-and-break device or means it will be noted that it comprises a first or forward U-shaped clip 48 and a companion or complemental rearward elongated U-shaped clip 50. Both clips are basically the same. The first-mentioned clip 48 comprises an elongated bight portion 52 (FIG. 3) the left-hand end portion of which is laterally directed as at 54 and provided with an integral semi-circular outstanding axially positioned adapter. This adapter 56, also referred to as a saddle, is fitted atop the end portion 58 of the adhesive strip 60 carried by the top half of the rod. The other laterally directed end portion is denoted at 62 and constitutes a relatively stationary contact element (FIG. 3). The complemental clip 50, also of elongated U-shaped form, comprises a cooperatively positioned elongated bight portion 64 whose laterally directed end 66 constitutes the second contact element and is opposed to the contact element 62 and unique in that it is provided with a manually regulatable adjusting screw 68 which renders the two contact elements adjustable for sensitivity of actuation. The other laterally directed end portion 70 of the clip is connected with the aforementioned socket member 72 and is also provided with an outstanding axially aligned semi-circular adapter of saddle 74 which is seated or saddled atop the end portion 76 of the adhesive attaching means, whereby to thus locate the two clips in coordinating relationship. It will be noticed that the elongated U-shaped clips 48 and 50 open in opposite directions in order to achieve the desired oriented and functioning relationship. Appropriate wire ends are denoted at 78, 80 and 82 but are not detailed inasmuch as it is evident that the wiring diagram 46 shows the manner in which the pull responsive circuit make-and-break means 44 cooperates with the simultaneously functioning bite signals 26 and 40.

In actual practice it is desirable that the fastening members 38 of the aforementioned clamps 36 be located in the manner shown so as to avoid interfering with the functioning of the fishing line. Also it will be evident that while the adhesive strip means 60 is preferred as a way of fastening the circuit make-and-break means 44 in place and is preferably made of insulative material, it would be within the purview of the invention to mount the adapters by tightly bound wrapping elements (not shown).

It will be understood that when a fish bites, the portion 10 of the rod bends as shown in FIG. 6, causing the contacts 62 and 66 to come together, or substantially so, thereby activating both the light bulb 40 and buzzer 32 and, in so doing, to alert the fisherman that he has a fish on the line. As stated the adjusting screw 68 allows the angler to make whatever adjustment is needed to effectively vary the tug on the line.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a fishing rod having an inward end provided with a handgrip and a pressure responsive bendably resilient outward end portion, distributively positioned line guide eyes carried by said rod, a fishing line slidingly threaded through the respectively cooperable eyes, inward and outward electric current conducting clips having forward and rearward end portions supported atop oriented surfaces of said bendably resilient outward end portion and having adjacent end portions provided with confronting and coordinating terminal ends providing normally open but closable contact elements, and bit signalling means supported by said rod and electrically and operatively connected to said clips; said contact elements being positioned together in close spaced parallel relationship, one contact element being provided with a setscrew which is cooperatively aligned with and manually adjustable toward and from the other contact element to controllably vary the coactive functioning of said contact elements at will.

2. In combination, a fishing rod having an inward end provided with a handgrip and a pressure responsive bendably resilient outward end portion, distributively positioned line guide eyes carried by said rod, a fishing line slidingly threaded through the respectively cooperable eyes, inward and outward electric current conducting clips having forward and rearward end portions supported atop oriented surfaces of said bendably resilient outward end portion and having adjacent end portions provided with confronting and coordinating terminal ends providing normally open but closable contact elements, and bite signalling means supported by said rod and electrically and operatively connected to said clips, the forward and rearward end portions of said clips being provided with saddle-like extensions providing adapters and said adapters being positioned and retentively anchored atop said outward end by a strip of adhesive material which is adhesively superimposed upon and bonded to the coacting top surface of said rod.

3. In combination, a fishing rod having an inward end provided with a handgrip and a pressure responsive bendably resilient outward end portion, distributively positioned line guide eyes carried by said rod, a fishing line slidingly threaded through the respectively cooperable eyes, inward and outward electric current conducting clips having forward and rearward end portions supported atop oriented surfaces of said bendably resilient outward end portion and having adjacent end portions provided with confronting and coordinating terminal ends providing normally open but closable contact elements, and bite signalling means supported by said rod and electrically and operatively connected to said clips, said clips being basically and structurally alike, each clip being elongated and approximately U-shaped in plan and embodying an elongate bight portion and short lateral inward and outward end portions the respective inward end portions providing the contact elements and the outward end portions having outstanding semi-circular extensions, said extensions defining anchoring adapters, one adapter being provided with a socket member.

4. The combination defined in claim 3, a light bulb removably and accessibly mounted in said socket member, a casing containing batteries, a buzzer and an off-on switch, and said casing having side-opening clamps on a bottom side fastened on a selected portion of said rod, and means electrically wiring said light and buzzer together for simultaneous operation.

5. For use on a bendably resilient outer end portion of a conventional type reel and line-equipped fishing rod, an electric circuit make-and-break attachment comprising a pair of complemental inward and outward electric current conducting clips, each clip being elongated and substantially U-shaped in plan and embodying an elongate bight portion and short lateral inward and outward end portions, the respective inward end portions providing the contact elements and the outward end portions having outstanding semi-circular extensions, said extensions defining anchoring adapters, one adapter being provided with a socket member.

6. The combination defined in claim 5, a light bulb removably and accessibly mounted in said socket member, a casing containing batteries, a buzzer and an off-on switch, and said casing having side-opening clamps on a bottom side fastened on a selected portion of said rod, and means electrically wiring said light and buzzer together for simultaneous operation.

7. In combination, a fishing rod having a bendably resilient outward end portion with line guide eyes positioned thereon, a line extending through said eyes, electric clips, connected to electrically wired bit signalling means, and positionable atop, forwardly and rearwardly of, the longitudinal extent of said rod, said clips each including an elongated bight portion, with adjacent portions of the clips providing electrical contact portions, and the distant ends of the respective bight portions including lateral extensions defining anchoring adapters, one of said adapters defining an electrical socket member.

* * * * *